US011781919B2

(12) United States Patent
Clements et al.

(10) Patent No.: US 11,781,919 B2
(45) Date of Patent: Oct. 10, 2023

(54) TEMPERATURE GRADIENT SENSING IN PORTABLE ELECTRONIC DEVICES

(71) Applicant: Apple Inc., Cupertino, CA (US)

(72) Inventors: James C. Clements, Campbell, CA (US); Chad A. Bossetti, Santa Clara, CA (US); Habib S. Karaki, Sunnyvale, CA (US); Paul Mansky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/882,423

(22) Filed: Aug. 5, 2022

(65) Prior Publication Data

US 2022/0373404 A1    Nov. 24, 2022

Related U.S. Application Data

(63) Continuation of application No. 16/935,046, filed on Jul. 21, 2020, now Pat. No. 11,408,778.

(51) Int. Cl.
*G01K 7/02* (2021.01)
*G01K 7/22* (2006.01)
*G01K 3/14* (2006.01)

(52) U.S. Cl.
CPC .............. *G01K 7/02* (2013.01); *G01K 3/14* (2013.01); *G01K 7/22* (2013.01)

(58) Field of Classification Search
CPC .................................. G01K 7/02; G01K 7/22
(Continued)

(56) References Cited

U.S. PATENT DOCUMENTS

| 4,935,345 A | 6/1990 | Guilbeau |
| 5,623,594 A | 4/1997 | Swamy |

(Continued)

FOREIGN PATENT DOCUMENTS

| CA | 2654084 | 12/2007 |
| CN | 103873636 | 6/2014 |

(Continued)

OTHER PUBLICATIONS

Translation of CN106706167B (Year: 2017).*
(Continued)

*Primary Examiner* — Mirellys Jagan
(74) *Attorney, Agent, or Firm* — Brownstein Hyatt Farber Schreck, LLP

(57) ABSTRACT

An electronic device housing encloses a temperature sensing system including a temperature sensor and a differential temperature probe. The differential temperature probe includes a flexible substrate defining two ends. A first end is thermally coupled to the temperature sensor and a second end is thermally coupled to a surface, volume, or component of the electronic device. The temperature probe is an in-plane thermopile including a series-coupled set of thermocouples extending from the first end to the second end. A temperature measured at the temperature sensor can be a first measured temperature and a voltage difference across leads of the differential temperature probe can be correlated to a differential temperature relative to the first measured temperature. A sum of the differential temperature and the first measured temperature is a second measured temperature, quantifying a temperature of the second end of the differential temperature probe.

19 Claims, 12 Drawing Sheets

(58) Field of Classification Search
USPC .......................................... 374/179, 208, 141
See application file for complete search history.

(56) References Cited

U.S. PATENT DOCUMENTS

| | | |
|---|---|---|
| 6,639,395 B2 | 10/2003 | Male |
| 6,741,470 B2 | 5/2004 | Isenburg |
| 7,299,090 B2 | 11/2007 | Koch |
| 7,416,332 B2 | 8/2008 | Rountree et al. |
| 7,479,116 B2 | 1/2009 | Yarden et al. |
| 7,622,896 B2 | 11/2009 | Nakagawa |
| 7,649,439 B2 | 1/2010 | Thomsen, III |
| 7,852,710 B2 | 12/2010 | Kelly et al. |
| 8,292,495 B2 | 10/2012 | Bieberich et al. |
| 8,292,502 B2 | 10/2012 | Bieberich et al. |
| 8,304,851 B2 | 11/2012 | Trifonov |
| 8,550,702 B2 | 10/2013 | Campbell et al. |
| 8,617,381 B2 | 12/2013 | Sun et al. |
| 8,649,998 B2 | 2/2014 | Yarden et al. |
| 8,954,288 B2 | 2/2015 | Aljabari |
| 9,300,157 B2 | 3/2016 | Bergqvist et al. |
| 9,304,520 B2 | 4/2016 | Cheng |
| 9,326,097 B2 | 4/2016 | Sen et al. |
| 9,438,071 B1 | 9/2016 | Heiberg |
| 9,562,869 B2 | 2/2017 | Mueller et al. |
| 9,599,520 B2 | 3/2017 | Angeli et al. |
| 9,671,296 B2 | 6/2017 | Niederberger et al. |
| 9,733,130 B2 | 8/2017 | Blundell |
| 9,976,914 B2 | 5/2018 | Radhakrishnan et al. |
| 9,990,172 B2 | 6/2018 | Komaromi et al. |
| 9,993,178 B2 | 6/2018 | Panescu et al. |
| 10,151,527 B2 | 12/2018 | Rusnack et al. |
| 10,197,457 B2 | 2/2019 | Jang et al. |
| 10,238,301 B2 | 3/2019 | Weebadde et al. |
| 10,244,985 B1 | 4/2019 | Sayani et al. |
| 10,309,840 B2 | 6/2019 | Kalyanasundaram |
| 10,371,584 B2 | 8/2019 | Kim et al. |
| 10,500,087 B2 | 12/2019 | Thomas et al. |
| 10,750,951 B1 | 8/2020 | Prachar |
| 10,827,931 B2 | 11/2020 | Meyerson et al. |
| 10,987,054 B2 | 4/2021 | Pandya et al. |
| 11,224,344 B2 | 1/2022 | Ellis et al. |
| 11,253,157 B2 | 2/2022 | Tanaka et al. |
| 11,406,268 B2 | 8/2022 | Tsuchimoto |
| 11,408,778 B2 | 8/2022 | Clements et al. |
| 11,419,549 B2 | 8/2022 | Shimuta |
| 2005/0139250 A1 | 6/2005 | DeSteese et al. |
| 2008/0234004 A1 | 9/2008 | Logue et al. |
| 2010/0245090 A1 | 9/2010 | Smith et al. |
| 2011/0119018 A1 | 5/2011 | Skarp |
| 2011/0245713 A1 | 10/2011 | Rensen et al. |
| 2012/0128024 A1 | 5/2012 | Tsuchida et al. |
| 2014/0163765 A1 | 6/2014 | Jain et al. |
| 2017/0007167 A1 | 1/2017 | Kostic et al. |
| 2017/0288452 A1 | 10/2017 | Adams et al. |
| 2018/0004169 A1 | 1/2018 | Matsuzaki et al. |
| 2018/0028072 A1 | 2/2018 | Shi |
| 2018/0206729 A1 | 7/2018 | Wang et al. |
| 2019/0175024 A1 | 6/2019 | Lan et al. |
| 2021/0121071 A1 | 4/2021 | Mensch et al. |
| 2021/0186336 A1 | 6/2021 | Bellifemine et al. |
| 2021/0264346 A1 | 8/2021 | Momayez et al. |
| 2021/0278290 A1 | 9/2021 | Ghoreyshi et al. |
| 2021/0404883 A1 | 12/2021 | Rahmani et al. |
| 2022/0000370 A1 | 1/2022 | Blom et al. |
| 2022/0087534 A1 | 3/2022 | Mansky et al. |
| 2023/0085860 A1 | 3/2023 | Gaubert et al. |
| 2023/0093738 A1 | 3/2023 | Ko et al. |

FOREIGN PATENT DOCUMENTS

| | | | |
|---|---|---|---|
| CN | 106706167 B | * 5/2019 | ............ G01K 17/06 |
| CN | 112444322 | 3/2021 | |
| DE | 102009003848 | 11/2010 | |
| JP | 2012132818 | 7/2012 | |
| KR | 20180097191 | 8/2018 | |
| WO | WO 13/185679 | 12/2013 | |
| WO | WO 18/152566 | 8/2018 | |
| WO | WO 20/249665 | 12/2020 | |

OTHER PUBLICATIONS

U.S. Appl. No. 17/891,838, filed Aug. 19, 2022, Ko et al.
U.S. Appl. No. 17/947,823, filed Sep. 19, 2022, Gaubert et al.
Maurer et al., "eWatch: a wearable sensor and notification platform," International Workshop on Wearable and Implantable Body Sensor Networks (BSN'06), Apr. 3-5, 2006, 4 pages.

* cited by examiner

TEMPERATURE GRADIENT SENSING IN PORTABLE ELECTRONIC DEVICES

CROSS-REFERENCE TO RELATED APPLICATION

This application is a continuation of U.S. patent application Ser. No. 16/935,046, filed Jul. 21, 2020, the contents of which are incorporated herein by reference as if fully disclosed herein.

TECHNICAL FIELD

This application relates to temperature sensing in portable electronic devices and, in particular, to systems and methods for precisely determining a temperature gradient between two or more discrete locations within a portable electronic device housing.

BACKGROUND

An electronic device can include a temperature sensor. An output from the temperature sensor can be used to calibrate, or adjust, an output from another sensor or subsystem of the electronic device that is sensitive to changes in temperature.

Many electronic devices include multiple sensors or subsystems that are sensitive to temperature. However, because conventional temperature sensors reserve volume within an electronic device housing, and can be expensive components, it is often impractical to include a temperature sensor dedicated to each temperature-dependent sensor or subsystem of an electronic device. As a result, at least some sensors or subsystems of conventional electronic devices are operated in a suboptimal, temperature-dependent, manner.

SUMMARY

Embodiments described herein take the form of a differential temperature sensor probe for a temperature sensor of a portable electronic device. The temperature sensor is configured to measure absolute temperature of a surface thereof. The temperature probe is configured to generate a voltage corresponding to a temperature gradient between a first end of the probe and a second end of the probe. The temperature sensor can be disposed within an electronic device housing. A first end of the probe can be coupled to the temperature sensor and a second end of the probe can be coupled to any suitable surface, whether internal or external, of the electronic device. As a result of this construction, an accurate absolute temperature measurement can be obtained for any surface or volume of an electronic device.

For such embodiments, the temperature sensor can be any suitable temperature sensor but in many examples, the temperature sensor is a high-precision and high-accuracy absolute temperature sensor that defines a sensing surface (e.g., an external surface of an encapsulation or potting enclosing electronics and/or integrated circuits cooperating to define the temperature sensor as an electronic component). In this construction, the temperature sensor can be configured to measure a temperature, at any given sampling time or sampling rate, of any surface or volume to which the sensing surface is exposed.

In these examples, the temperature sensor probe includes a thin-film substrate defining a first end thermally coupled to the temperature sensor and a second end thermally coupled to a surface within the portable electronic device. An in-plane thermopile is defined on the thin-film substrate. The in-plane thermopile is defined by a conductive trace disposed in a serpentine pattern that oscillates between the first end and the second end. In this manner, the conductive trace defines an array of thermocouples conductively coupled in series. Each thermocouple of the series includes a first portion that extends from the first end to the second end of the thin-film substrate and a second portion that extends from the second end to the first end of the thin-film substrate. The first portion and the second portion are joined at a junction defined at the second end.

As a result of this construction, the in-plane thermopile is configured to generate a voltage corresponding to a temperature difference between the temperature sensor (which takes the same temperature as the first end of the low-profile substrate) and the surface within the portable electronic device.

In some examples, the conductive trace is defined on a single side of the thin-film substrate. In other embodiments, the conductive trace can be defined on a top surface (e.g., a first surface) and a bottom surface (e.g., a second surface) of the thin-film substrate. In the second case, vias can pass through the thin-film substrate to electrically couple linear traces on the top surface to linear traces on the bottom surface. In this manner, the conductive trace forms a single electrical circuit component that defines a conductive path that oscillates from the first end to the second end.

The various linear traces defining the single conductive trace can be formed from different conductive materials in order to leverage the Seebeck effect. In particular, traces extending from the first end to the second end (e.g., a first set of linear conductive traces) can be formed from a first conductive material, such as a metal or metal alloy. Similarly, traces extending from the second end to the first end can be formed from a second conductive material, such as a different metal or metal alloy. In typical examples, the Seebeck ratio defined relative to the first conductive material and the second conductive material is negative. For example, the first conductive material may be constantan and the second conductive material may be chromel, another nickel alloy, copper or another metal. Example constructions include Type-E thermocouples (e.g., constantan-chromel) and/or Type-T thermocouples (e.g., constantan-copper). Other constructions include thermocouples of other types.

In many embodiments, the thin-film substrate is formed from a flexible material (e.g., polyimide, polyethylene terephthalate, polycarbonate, plastics, acrylics, liquid crystal polymers, and so on). In many implementations, the thin-film substrate has a high aspect ratio. As one example, in some embodiments, the aspect ratio may be greater than two. In other examples, the aspect ratio may be greater than ten.

As a result of both flexibility and relative length, and subject only to physical properties of the thin-film substrate (e.g., length, width, depth, minimum bend radius, and so on), the second end can be positioned substantially anywhere within an electronic device housing. In other examples, the second end can be positioned external to an electronic device housing.

Further embodiments described herein take the form of a temperature sensing system for an electronic device. The temperature sensing system can include a temperature sensor defining an exterior surface and a differential temperature probe thermally coupled to the exterior surface of the temperature sensor. As with other embodiments described herein, the differential temperature probe can have a high aspect ratio (e.g., an aspect ratio greater than 1) and can be formed from a thin-film material that is flexible.

In typical constructions, the differential temperature probe is defined by a flexible substrate in turn defining a first end and a second end. The second end is separated from the first end by a length of the flexible substrate. The first end of the substrate is thermally coupled to the exterior surface of the temperature sensor. The second end of the substrate can be coupled to and/or exposed to any suitable surface or volume. In typical implementations, the second end of the substrate can be coupled to an electronic component associated with a system, sensor, or subsystem of a portable electronic device.

The differential temperature probe is also defined, in part, by a conductive trace that defines a conductive path between a pair of leads disposed on the first end. The conductive trace is disposed in a serpentine pattern between the first end and the second end of the substrate. The conductive trace includes (1) a first set of traces disposed from a first conductive material extending from the first end to the second end and (2) a second set of traces disposed from a second conductive material extending from the second end to the first end.

The first conductive material is different from the second conductive material in order to leverage the Seebeck effect. In some embodiments, the first and second conductive materials may be different nickel alloys. In other constructions, the first and second conductive materials may be different metals, semiconductors, metal alloys, or pairings thereof.

As a result of this construction, a voltage difference between the pair of leads can be correlated to a temperature difference (a temperature gradient) between the exterior surface of the temperature sensor and the second end of the differential temperature probe. In further examples and embodiments, a temperature measurement obtained from the temperature sensor sampled at the same time a voltage difference between the leads of the differential temperature sensor can be used to calculate two different temperatures and/or a temperature and a temperature difference. In another phrasing, the voltage difference taken at a particular sampling time corresponds to a temperature gradient across the differential temperature probe (e.g., a temperature difference between the first end and the second end). An absolute temperature measurement taken at the same sampling time by the temperature sensor corresponds to an absolute temperature of the temperature sensor and, additionally, of the first end of the temperature gradient. By combining these two measurements, absolute temperature of the second end of the temperature probe can be determined.

For example, if the exterior surface of the temperature sensor is thermally coupled to a processor of an electronic device and the second end of the differential temperature probe is coupled to a battery of the same electronic device, the temperature sensor can be configured to output two discrete temperature measurements, one temperature associated with the processor and one temperature associated with the battery. As these temperature measurements are sampled relative to one another via the differential temperature probe, no further calibration or adjustment of the temperature values is required.

Additional embodiments described herein take the form of a method of operating a temperature sensing system for an electronic device to determine a first temperature and a second temperature of the electronic device, the method including operations such as: sampling a temperature sensor to obtain the first temperature; sampling a voltage difference between leads of a differential temperature probe thermally coupled to the temperature sensor and thermally coupled to a target surface of the electronic device; converting the voltage difference to a temperature difference; and summing the temperature difference and the first temperature to obtain the second temperature. Related embodiments can include multiple different temperature probes to obtain multiple differential temperature measurements which, in turn, can be correlated to multiple discrete temperature measurements.

In still further examples, average temperature of multiple points can be determined by leveraging a temperature probe as described herein. In these examples, the temperature probe can be formed into a shape that defines multiple distal ends (e.g., multiple second portions). An example shape is a hub and spoke shape or a cross shape. In the first example, a hub of the hub and spoke shape can be a first end of the temperature probe that includes a number of junctions of a number of thermocouples. Each distal end of each spoke of the hub and spoke shape can be coupled to, embedded into, or otherwise thermally coupled to different locations within an electronic device housing. As a result of this construction, a voltage difference between leads of the hub and spoke differential temperature probe can correspond to an average temperature of all spokes of the probe. In other words, an average temperature within the electronic device housing can be determined.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
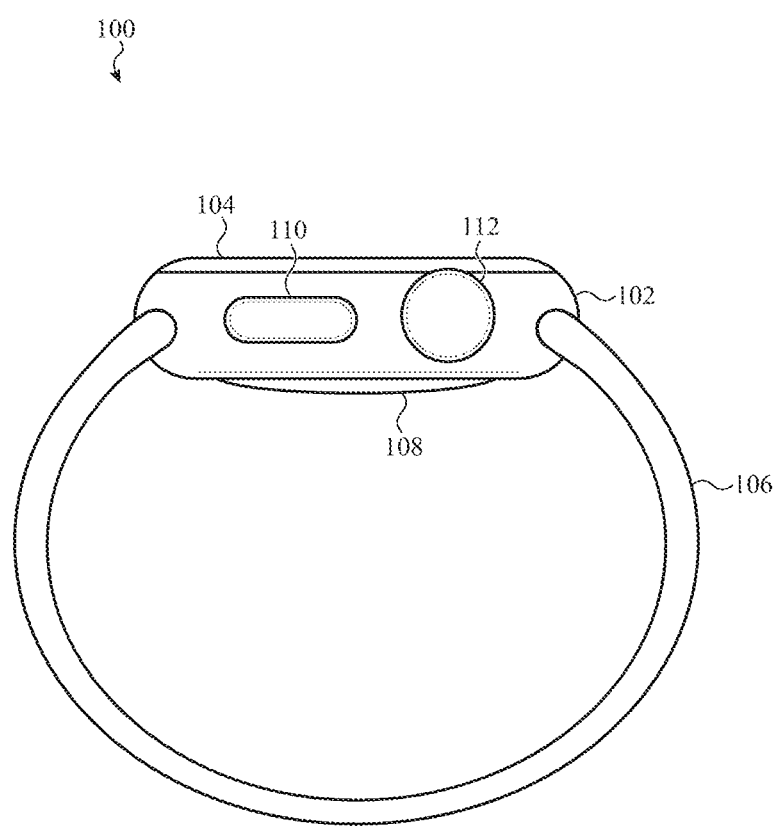
FIG. 1 depicts an example portable electronic device that can incorporate a temperature sensing system, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for sensing absolute temperature at multiple points (e.g., either absolute temperature or temperature gradients) by levering an output of a single temperature sensor. As used herein the phrase "absolute temperature" (or, more simply, "temperature") refers to a digital value or analog signal (or sequence, time series, or sample set thereof) that quantifies thermal energy of a body, surface, or volume in a standard unit (e.g., Celsius, Fahrenheit, Kelvin, and so on) or a non-standard unit (e.g., a graduated relative scale). For simplicity of description, the embodiments that follow reference temperature measurements in degrees Celsius, but it may be appreciated that this is merely one implementation and other scales, units, or proportional values may be used in other embodiments.

More specifically, embodiments described herein reference temperature sensing systems configured to detect, with high precision and accuracy, a temperature of each of one or more points (herein "probe locations") relative to a reference temperature defined by a temperature sensor disposed within an enclosure of a portable or stationary electronic device.

Each probe location can be probed with a differential temperature probe having two ends, one of which is thermally coupled (e.g., by interfacing, with a thermal paste, or using another suitable method) to the temperature sensor. As used herein, the phrase "differential temperature probe" refers to a structure or circuit configured to generate a voltage proportionality related to a difference in absolute temperature between two or more points.

In particular, as noted above, a first end of a differential temperature probe as described herein is thermally coupled to the temperature sensor and, by virtue thereof, is at the reference temperature, the "reference temperature" being defined as a temperature detected by the temperature sensor itself.

A second end of a differential temperature probe as described herein is thermally coupled to one respective probe location and, by virtue thereof, is at the absolute temperature of that respective probe location.

As a result of this construction, a differential temperature probe as described herein is configured to generate a voltage as a result of, and in proportion to, the temperature difference between the respective probe location and the reference temperature which, in turn, can be correlated to a "differential temperature," which is a positive, zero, or negative temperature difference defined relative to the reference temperature. As may be appreciated by a person of skill in the art, a sum of the differential temperature and the reference temperature is equal to the absolute temperature of the probe location. In this manner, output from a single temperature sensor within a portable electronic device can be leveraged to accurately and precisely detect (and output) a temperature of each of multiple probe locations within or external to an electronic device housing.

More particularly, it may be appreciated that a probe location as described herein can be any component, part, volume, surface, or body enclosed by, coupled to, or defined by an electronic device housing. For example, a probe location of a temperature sensing system can be internal to an electronic device housing (e.g., within an internal volume defined by the housing) whereas in other cases, a probe location can be external to an electronic device housing.

An internal probe location may be defined relative to a particular electronic component within an electronic device housing, such as a processor, memory, battery, display, or input sensor. In other cases, an external probe location may be defined relative to an external surface of an electronic device housing, such as a cover glass surface, an exterior button or input device, or a back surface such as a back crystal of a smart watch. It is appreciated that these foregoing examples are not exhaustive; any suitable probe location can be selected and suitable probe locations may vary from embodiment to embodiment, and from portable electronic device to portable electronic device.

Example portable electronic devices that can include a temperature sensing system as described herein to detect and quantify absolute temperature at one or more probe locations include, but are not limited to: laptop computers; cellular phones; wearable electronic devices; accessory devices; and so on.

For simplicity of description, the embodiments that follow reference a wearable electronic device as an example of a portable electronic device, but it may be appreciated that this is merely one example and that in other implementations of embodiments described herein, other portable or stationary electronic devices may be selected.

Broadly, a wearable electronic device incorporating a temperature sensing system as described herein can detect absolute temperature of multiple discrete locations or volumes without requiring multiple temperature discrete temperature sensors. As a result, a wearable electronic device can recover and/or reallocate substantial internal volume otherwise conventionally allocated to multiple temperature sensors and can be manufactured at lower cost without sacrificing performance of sensors of subsystems of the wearable electronic device that are temperature dependent.

In addition, a wearable electronic device incorporating a temperature sensing system as described herein may be able to detect absolute temperature of components, surfaces, and/or volumes that a dedicated temperature sensor simply cannot reach. For example, in many embodiments, a differential temperature probe (as described in greater detail below) may be implemented on a flexible thin-film substrate that may be routed to a probe location that is substantially smaller than, thinner than, or otherwise not able to be thermally coupled to a conventional temperature sensor. For example, a thin-film differential temperature probe may be routable to individual display layers of a display stack. In other cases, a thin-film differential temperature probe may be routed around, or through, other components within the wearable electronic device.

In other words, because of the ability of a thin-film differential temperature probe (as described herein) to be routed and/or placed substantially anywhere within a wearable electronic device housing, the temperature sensor generating the reference temperature can also gain substantial placement flexibility. In this manner, the wearable electronic device itself can be designed and manufactured with fewer positional and/or component constraints; it may not be required to position a temperature sensor in any particular location of the wearable electronic device if a differential temperature probe, as described herein, can be routed to any arbitrary probe location. Further, in some embodiments, multiple differential temperature probes can be thermally coupled to a single temperature sensor. In such constructions, different differential temperature probes can be routed to different probe locations and, in turn, can precisely and accurately detect temperature of any number of probe locations within a wearable electronic device. In still further examples, as may be appreciated by a person of skill in the art, cost and design complexity savings achieved by incorporating a temperature sensing system as described herein can be used to incorporate a higher quality temperature sensor which, in turn, can dramatically improve temperature differential detection performance of all differential temperature probes.

For example, a conventional wearable electronic device may include a first temperature sensor and a second temperature sensor. In one example, the first temperature sensor is thermally coupled to a processor of the conventional wearable electronic device and the second temperature sensor is thermally coupled to a battery of the conventional wearable electronic device. The conventional electronic device may leverage temperature measurements from these two sensors to inform one or more operations or tasks related to the processor or the battery.

In this example construction, it may be appreciated that positional constraints for the first temperature sensor and the second temperature sensor are well-defined; the first temperature sensor must be placed physically proximate to the processor of the conventional wearable electronic device and, likewise, the second temperature sensor must be placed physically proximate to the battery. As may be appreciated by a person of skill in the art, each of these positional constraints substantially informs design and cost of the overall wearable electronic device.

In many cases, due to cost and design constraints, the preceding example wearable electronic device may not incorporate additional temperature sensors which, in turn, can reduce performance of other temperature-dependent components.

Contrasting the preceding example, a wearable electronic device as described herein that includes a temperature sensing system can reduce parts use and design complexity by requiring only that a single temperature sensor is included within the wearable electronic device housing. A first differential temperature probe can be routed from the temperature sensor to the processor, a second differential temperature probe can be routed from the temperature sensor to the battery, and a third differential temperature probe can be routed from the temperature sensor to another temperature-dependent component (e.g., display, biometric sensor, and so on). It may be appreciated that systems as described herein can dramatically improve performance of temperature-dependent sensors and systems, can reduce part cost, can reduce manufacturing complexity, and can reduce design constraints. In a more simple and general phrasing, embodiments described herein (1) facilitate higher performance from temperature-dependent systems of wearable electronic devices, (2) facilitate less expensive, less complex manufacturing of wearable electronic devices and (3) facilitate a reduction in size, weight, and power consumption of wearable electronic devices.

Further to the foregoing described advantages of a temperature sensing system, other embodiments described herein can position one or more probe locations so as to evaluate a skin or body temperature of a user or wearer of a wearable electronic device. For example, in some embodiments, a differential temperature probe can position its second end (also referred to as a "distal" end) such that the second end is thermally coupled to a portion of the housing of the wearable electronic device that touches a user's skin, such as a back crystal of a smart watch.

As a result of this constructions, the wearable electronic device can obtain a highly accurate and highly precise measurement of the user's skin temperature which, in turn, can be leveraged for: health or fitness recommendations; health or fitness tracking; biometric identification; wearable device fit evaluation; and so on. It may be appreciated that these foregoing examples are not exhaustive. Instead, a person of skill in the art may readily appreciate that any suitable biometric purpose related to or informed by temperature can be achieved by leveraging systems as described herein.

In other cases, a distal end of a differential temperature probe can be exposed to the external environment (e.g., a portion of the distal end may be disposed along a seam between two clamshell portions of the housing). As a result of this construction, the wearable electronic device can obtain a highly accurate and highly precise reading of temperature external to the electronic device.

In still further embodiments, as noted above, a single temperature sensor can be associated with any suitable number of differential temperature probes in turn having respective distal ends coupled to any number of different internal or external parts, components, volumes, or surfaces of a wearable electronic device. In one example, every integrated circuit within a wearable electronic device housing can be thermally coupled to a distal end of a different differential temperature probe. In this construction, each and every part within the wearable electronic device may have some operation, output, or input calibrated or adjusted as a function of temperature.

The preceding examples all reference a single temperature sensor and at least one differential temperature probe having a distal end coupled to a selected probe location. This is merely one example construction of a temperature sensing system as described herein. For example, in some embodiments, multiple temperature sensors may be used, each of which may have or be associated with one or more differential temperature probes that, in turn, may include distal ends that thermally couple to different components, surfaces, volumes, and so on with an electronic device housing.

In yet further embodiments, two or more temperature sensors within an electronic device can be cross-calibrated. In particular, in such constructions, a first temperature sensor can thermally couple a distal end of a first differential temperature probe to a surface of a second temperature sensor that, in turn, couples a distal end of a second differential probe to a surface of the first temperature sensor. In this manner, different temperature sensing systems in an electronic device housing can be used to calibrate one another, thereby further improving performance of systems, sensors, or subsystems of a wearable electronic device.

In addition, a temperature sensing system as described herein can be leveraged in different ways when incorporated into different classes of wearable electronic devices. For example, a smart watch may leverage a temperature sensing system to detect a temperature of a processor and a back crystal. In another example, a pair of wireless headphones or earbuds may leverage a temperature sensing system to detect a temperature of an inner ear of a wearer of those headphones or earbuds. In yet another example, a smart stylus may leverage a temperature sensing system to detect whether a user is grasping the stylus.

The foregoing embodiments are not exhaustive of the benefits or potential use cases for a temperature sensing system as described herein. It may be appreciated that in different implementations, a temperature sensing system may be leveraged for a different purpose or one or more purposes than those described above.

For simplicity of description, the embodiments that follow reference a wearable electronic device that incorporates a single temperature sensing system as described herein. The temperature sensing system, as noted above, includes a temperature sensor and a differential temperature probe.

For embodiments described herein, a differential temperature probe is configured as an in-plane thermopile implemented as an electrical series of thermocouples defined across a length of a high aspect ratio substrate. In one example, the substrate is formed from a flexible material such as polyimide, although this is merely one example and other suitable flexible (or rigid) materials may be used in other implementations.

As a result of this construction, the substrate defines a first end ("reference" end) and a second end (the "distal" end). The distal end is separated from the reference end by a length of the substrate, which is substantially greater than a width (or depth) of the substrate. In many embodiments, an aspect ratio of ten or twenty may be suitable. In other cases, higher or lower aspect ratios may be selected but it may be appreciate that for embodiments described herein, a high aspect ratio of length relative to width is preferred.

Between the reference end and the distal end of the substrate, parallel linear electrical traces can be disposed. Alternating pairs of these traces can be electrically coupled to one another to define junctions at both the reference end and the distal end of the substrate.

In a more general and broad phrasing, a differential temperature sensor as described herein can be defined by a rectilinear substrate, that is typically flexible, having a length greater than its width (e.g., an aspect ratio greater than 1). Along the flexible substrate's length, a conductive trace is formed in a serpentine pattern, alternating from (doubling back) the reference end to the distal end. In these constructions, alternating portions of the conductive trace are formed with an opposite one of two conductive materials, such as metals, semiconductors, or metal alloys. In some examples, nickel alloys can be used that are non-magnetic (so as to not interfere with operations of the wearable electronic device and/or to not be subject to magnetic interference sources). Examples of suitable alloys can include constantan, nickel alloys, copper, copper alloys, and chromel. In other cases, different metals or alloys can be selected. In many high-performance embodiments, a pair of different metals that exhibit a negative Seebeck coefficient can be selected.

In other examples, different shapes can be used for both the substrate and the path(s) taken by the linear traces. More specifically, in some examples, linear traces and/or rectilinear substrates may not be required. In some cases, a meandering trace can be used that does not follow a particular repeating pattern or path. In other cases, a trace can follow a repeating pattern (e.g., zig-zag, curved, scalloped, and so on) from a first end to a second end. In other cases, a pair of traces may generally follow a first path whereas a second pair of traces follows a second path. In still further examples, a substrate supporting a differential temperature probe as described herein can have a width greater than its length (e.g., having an aspect ratio less than 1). Any suitable shape for a substrate and/or any suitable pattern (whether repeating, regular, or otherwise) can be used for traces as described herein. Some traces can be disposed on a first surface of a substrate, whereas other traces are disposed on a second surface of the substrate. In some cases, a substrate can include internal layers onto which, or between which, one or more layers of traces can be disposed.

In some cases, a differential temperature probe as described herein can be disposed on a thin-film substrate that itself includes one or more circuits or circuit traces. For example, a flexible circuit may be used to route signals to a particular element, such as a heating element (e.g., heated vehicle seat) or a camera element. A differential temperature probe as described herein can be disposed onto the same flexible circuit. In this manner, a single flexible circuit can be used for both signaling purposes and temperature sensing (temperature gradient sensing) purposes.

In this manner, the conductive trace defines a single electrically conductive path, formed from pairs of alternating conductive materials, that is configured to leverage the Seebeck effect to generate a voltage corresponding to a temperature difference from the reference end to the distal end across the length of the flexible substrate. This voltage can thereafter be correlated to a temperature differential which, in turn, can be summed with a temperature output from the temperature sensor to output an absolute temperature of the probe location.

It may be appreciated that any suitable circuitry can be used to sample and/or otherwise measure a voltage across leads of a conductive trace that defines a differential temperature probe as described herein. In some cases, leads of a differential temperature probe can be conductively coupled to an input of a temperature sensor. In other words, in some embodiments, a temperature sensor of a temperature sensing system can be configured to receive, as input, a voltage corresponding to a temperature difference between a reference temperature measured by that temperature sensor and some arbitrary probe location. In other cases, a separate processor and/or circuit can be configured to receive, as input, a voltage output from a differential temperature probe. In this example, the separate processor and/or circuit can be configured to convert the measured/sampled voltage into a digital value for simplified processing.

In yet other examples, conversion of a voltage output from a differential temperature probe can be performed in whole or in part by an analog to digital converter. In yet other examples, conversion of a voltage output from a differential temperature probe can be performed by a general purpose processor within a wearable electronic device incorporating the differential temperature probe.

These foregoing examples are not exhaustive; it may be appreciated that any suitable technique, circuit, processor, software instance, analog to digital converter, or other suitable virtual or physical computing resource can be used to receive an input from a differential temperature probe, as described herein, and to prove as output a digital value (or analog voltage or current, or any other suitable variable output) that correlates with a temperature difference between a reference end and a distal end of that differential temperature probe. As used herein, the term "computing resource" (along with other similar terms and phrases, including, but not limited to, "computing device," or "processor" refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); home automation devices, both stationary and mobile (e.g., thermostats, smoke alarms, carbon dioxide alarms, security systems, alarm panels, home automation hubs, smart assistants, environmental sensors, home appliances, remote controls, security cameras, and so on); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

These foregoing and other embodiments are discussed below with reference to FIGS. 1-7. However, those skilled in the art will readily appreciate that the detailed description given herein with respect to these figures is for explanation only and should not be construed as limiting.

FIG. 1 depicts an example portable electronic device that can incorporate a temperature sensing system, such as described herein. More specifically, the portable electronic device is a wearable electronic device 100.

As noted above, a wearable electronic device is merely one example portable electronic device that can incorporate a temperature sensing system as described herein. Further, a portable electronic device is merely one example category of electronic device that may incorporate a temperature sensing system as described herein. As such, generally and broadly, it may be appreciated that any suitable electronic device can include one or more temperature sensing systems as described herein; the following described embodiments relate to wearable devices only for simplicity of description and illustration.

As shown in FIG. 1, the wearable electronic device 100 can include a housing 102 that encloses and supports one or more internal components of the wearable electronic device 100. Example components that may be included within the housing 102 include, but are not limited to: a processor; a working memory; a persistent memory; a battery; a sensor or sensing system; an input system; and acoustic output system; a haptic output system; and so on. In addition, the housing 102 supports a display 104 that can be leveraged by a processor of the wearable electronic device 100 to render a graphical user interface in order to solicit input from a user or wearer of the wearable electronic device 100.

The wearable electronic device 100 is illustrated as a smart watch that includes a band 106 for removably coupling to a user's wrist. It may be appreciated, however, that this is merely one example implementation of a wearable electronic device. Other wearable electronic devices include: smart cuff devices; wireless or wired headphones or earbuds; health monitoring devices; medical devices; partially or entirely implanted devices; and so on.

The wearable electronic device 100 may be configured to collect one or more biometric data from a user/wearer of the wearable electronic device 100 by leveraging one or more sensors enclosed in an internal volume defined by the housing 102. For example, in some embodiments, the wearable electronic device 100 may be configured to leverage a temperature sensing system (not shown) to detect an absolute temperature of a back crystal 108 that contacts the user's skin. In other examples, the wearable electronic device 100 may include a temperature sensing system to detect or quantify an absolute temperature of an input component that may be touched by a user, such as the linear input component 110 or the rotational input component 112. In either case, a rise in temperature of the input component, as detected by a temperature sensing system as described herein can be received as an input to the wearable electronic device 100 which, in response, can perform a function or task.

For example, temperature information can be leveraged by the wearable electronic device 100 for, without limitation: calibrating an internal sensor or subsystem of the wearable electronic device 100; monitoring a temperature of a processor of the wearable electronic device 100; changing a clock speed of a processor of the wearable electronic device 100; changing a write speed or read speed of a working memory of the wearable electronic device 100; adjusting a display brightness based on a temperature of the display 104; performing health or fitness analysis in response to a temperature of the back crystal 108; providing a health or fitness recommendation in response to a temperature of the back crystal 108 exceeding a threshold; detecting a particular material type based on a temperature of the band 106 (or a difference between a temperature of the band 106 and the housing 102); determining a health risk to the user based on a temperature of the housing 102 as compared to a temperature of the back crystal 108; estimate a user's basal body temperature (or skin temperature or other body temperature) based on a temperature of the back crystal 108; estimate a user's basal body temperature (or skin temperature or other body temperature) based on a known or predicted temperature gradient between the housing 102 and the user's skin; measuring or estimating a user's interior wrist temperature by determining a gradient between an external surface of the housing 102 and the user's wrist; estimating a second user's basal body temperature (or skin temperature or other body temperature) based by placing a portion of the housing 102 (e.g., a front crystal) on the second person's forehead, ear, or other body part; and so on. It may be appreciated that these examples are not exhaustive; the wearable electronic device 100 may be configured to leverage absolute temperature measurements in a number of suitable ways.

Further, as noted above, the wearable electronic device 100 need not be implemented as a smart watch or a wearable electronic device. In some cases, the wearable electronic device 100 can be implemented as a wireless ear bud configured to rest at least partially within a user's ear canal. In such implementations, a temperature measurement from within the user's ear canal can be used to determine whether the user has an elevated or lowered body temperature. This determination can be used to evaluate basal body temperature and/or a fever condition of the user.

The foregoing described temperature estimations/predications/estimations that relate to the user's basal body temperature can in turn be leveraged to generate a recommendation to the user to self-quarantine or a recommendation to the user to enable or review results of a contact-tracing application or service to determine whether an exposure risk to a contagious virus exists (e.g., COVID-19). In still further examples, medical attention can be signaled in response to determining that the user's temperature exceeds or falls below a threshold. In other examples, a user's basal body temperature can be used to estimate or predict an ovulation pattern.

The foregoing examples are not exhaustive. A person of skill in the art may readily appreciate that a temperature sensing system as described herein can be leveraged in a number of ways to improve performance of internal components, subsystems, and sensors of the wearable electronic device 100 and, additionally, may be leveraged to provide health and/or fitness recommendations to a user/wearer of the wearable electronic device 100.

Figure 2:
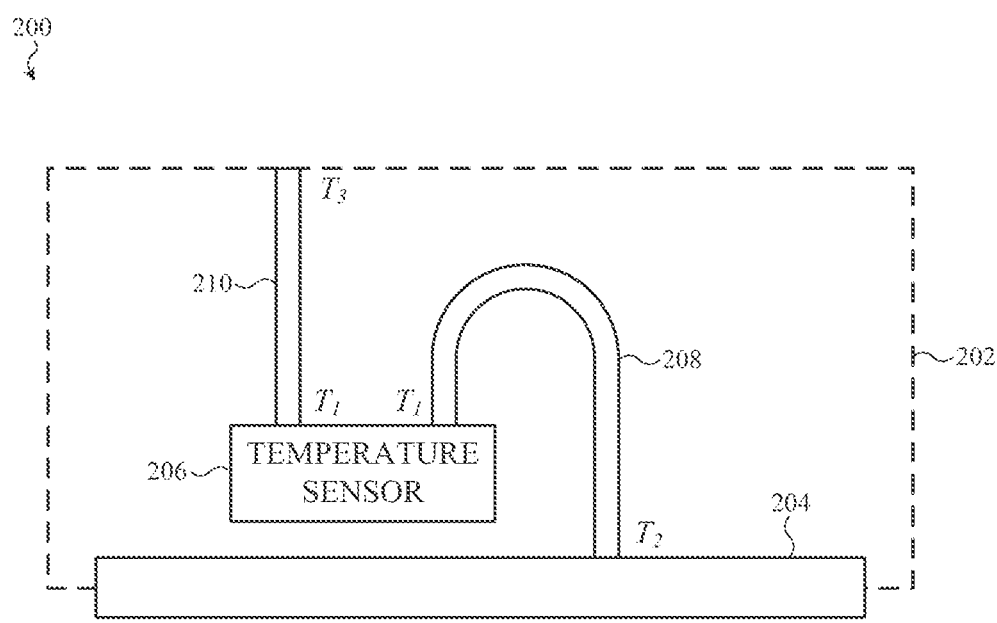
FIG. 2 depicts a simplified system diagram of a temperature sensing system, such as described herein, disposed within a housing of a portable electronic device.

FIG. 2 depicts a simplified system diagram of a temperature sensing system, such as described herein, disposed within a housing of a portable electronic device 200. The portable electronic device 200 can be any suitable portable electronic device, such as the wearable electronic device described above in reference to FIG. 1. In other cases, the portable electronic device 200 can be implemented in a different manner.

The portable electronic device 200 includes a housing 202 into which a temperature sensing system as described herein is disposed. The housing 202 can be coupled to and/or can include or may be partially defined by a body 204 defining an external surface. In an example in which the portable electronic device 200 is implemented as a smart watch, the body 204 may be a back crystal that contacts a user's skin. In an example in which the portable electronic device 200 is implemented as a wireless earbud/earphone, the body 204 may be a housing portion configured to contact an interior surface of a user's ear canal. In yet other implementations, the body 204 may be implemented as another class of electronic device, portable device, or wearable device and the body 204 may be implemented differently.

As noted above, the housing 202 of the portable electronic device 200 encloses a temperature sensor 206. The temperature sensor 206 can be any suitable circuit or integrated circuit package configured to quantify absolute temperature ambient to the temperature sensor 206.

The temperature sensor 206 may be implemented as a thermocouple, a resistance temperature detector, a thermistor, an optical temperature sensor, or as a semiconductor temperature sensor or any combination thereof. In many implementations, the temperature sensor 206 includes a purpose-configured (e.g., application-specific) processor or other integrated circuit configured to perform or coordinate one or more operations of the temperature sensor 206.

The temperature sensor 206, in many examples, is potted or otherwise encapsulated and may be configured to detect absolute temperature of a particular external surface thereof. In such embodiments, the temperature sensor 206 defines a "sensing surface" that can be thermally coupled to another component, element, or other body in order to measure an absolute temperature thereof. In the illustrated embodiment, the temperature sensor 206 defines a sensing surface on an upper surface thereof. As illustrated, the temperature of the sensing surface is labeled as $T_1$.

In this embodiment, the temperature sensing system includes a first differential temperature probe, identified as the differential temperature probe 208, and a second differential temperature probe identified as the differential temperature probe 210. The differential temperature probe 208 includes a reference end that is thermally coupled to the sensing surface. Similarly, the differential temperature probe 210 includes a reference end that is thermally coupled to the sensing surface. In this manner, the reference end of the differential temperature probe 208 has the same temperature, $T_1$, as the sensing surface. Similarly, the reference end of the differential temperature probe 210 has the same temperature, $T_1$, as the sensing surface.

As noted with respect to other embodiments described herein, one or both of the differential temperature probes can be formed to be at least partially flexible. In particular, the differential temperature probe 208 is shown as curving to meet an interior surface of the body 204. More particularly, the differential temperature probe 208 can include a distal end separated from the reference end by a length of the differential temperature probe 208. The distal end of the differential temperature probe 208 can be thermally coupled to an interior surface of the body 204, which may have a temperature $T_2$. In this manner, the distal end of the differential temperature probe 208 has the same temperature $T_2$ as the body 204. As shown, an end cap region of the distal end is positioned perpendicularly to the body 204, although it may be appreciated that this is merely one example. In other cases, the differential temperature probe 208 can be further curved to meet an interior surface of the body 204 in a parallel manner. In yet other cases, at least a portion of the distal end of the differential temperature probe 208 can be partially embedded into the body 204. Any suitable configuration is suitable.

Flexibility may not be required of all embodiments. In particular, the differential temperature probe 210 is shown extending in a linear manner to meet a different interior surface of the housing 202, a chosen probe location. As with the differential temperature probe 208, the differential temperature probe 210 can include a distal end separated from the reference end by a length of the differential temperature probe 210. The distal end of the differential temperature probe 210 can be thermally coupled to the chosen probe location, which may have a temperature $T_3$. In this manner, the distal end of the differential temperature probe 210 has the same temperature $T_3$ as the chosen probe location. As with the chosen probe location, an end cap region of the distal end of the chosen probe 210 location is positioned perpendicularly to the chosen probe location, although it may be appreciated that this is merely one example. In other cases, the differential temperature probe 210 can be further curved to meet an interior surface of the chosen probe location in a parallel manner. In yet other cases, at least a portion of the distal end of the differential temperature probe 210 can be partially embedded into the chosen probe location. Any suitable configuration is suitable.

In this manner, and as a result of these configurations, each of the differential temperature probes can generate a respective voltage (such as described above) that corresponds to the temperature difference associated with that particular differential temperature probe. For example, a first voltage generated by the differential temperature probe 208 corresponds to a difference between the reference temperature $T_1$ and the temperature of the body 204 $T_2$ whereas a second voltage generated by the differential probe 210 correspond to a difference between the reference temperature $T_1$ and the temperature of the chosen probe location $T_3$.

In some embodiments, the differential temperature probe 208 and the differential temperature probe 210 can be formed, at least in part, on the same flexible circuit.

As a result of the foregoing describe construction, the portable electronic device 200 can effectively and efficiently detect three temperatures (e.g., $T_1$–$T_3$) by leveraging only a single temperature sensor, the temperature sensor 206.

Figure 3A:
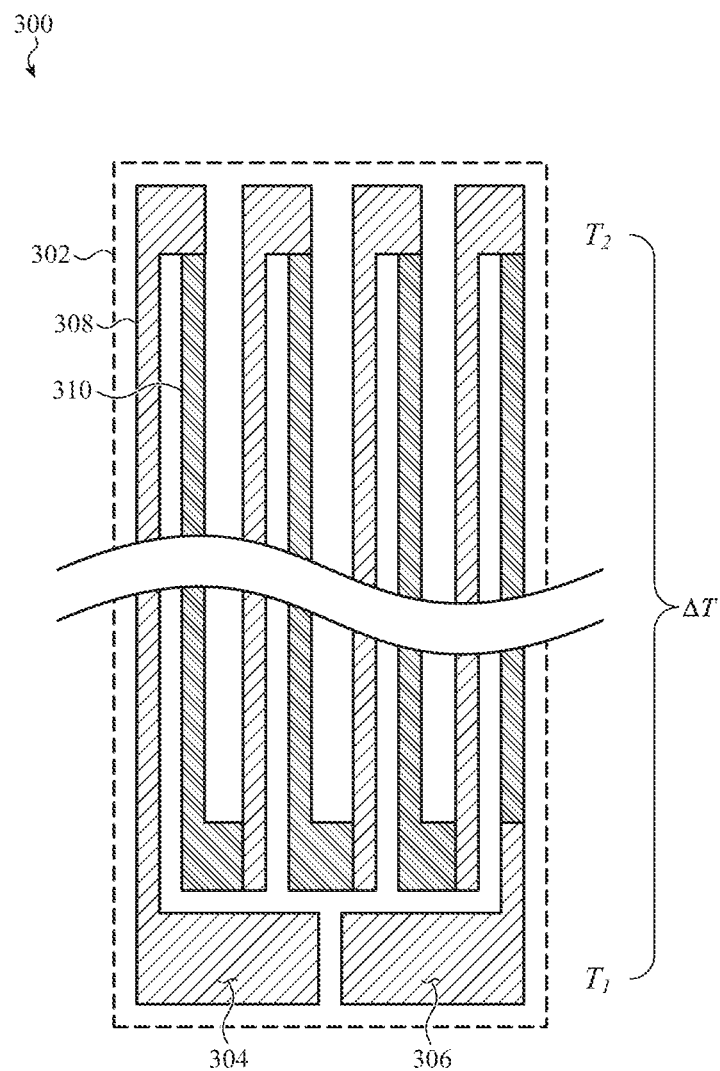
FIG. 3A depicts a differential temperature probe of a temperature sensing system, such as described herein.

FIG. 3A depicts a differential temperature probe of a temperature sensing system, such as described in reference to FIG. 2. In particular, the differential temperature probe 300 includes a substrate 302 having a high aspect ratio onto which two or more layers of different metals may be formed. For example, as described above, the substrate 302 can be a flexible or semiflexible, substrate (e.g., polyimide, plastics, polymers, polyethylene terephthalate, polycarbonate, acrylics, liquid crystal polymers, glass, metal, and so on) or, in certain embodiments may be a rigid substrate.

As noted above, a differential temperature probe such as the differential temperature probe 300 includes a single conductive trace formed in a serpentine pattern defined across a length thereof.

The conductive trace of the differential temperature probe 300 terminates with two electrodes, a first electrode 304 and a second electrode 306, between which a generated voltage corresponding to temperature differentials can be measured.

In addition, the conductive trace of the differential temperature probe 300 includes two sets of linear traces of conductive material that extend from a reference end onto which the electrodes (formed from the same material, in many examples) are defined to a distal end opposite the reference end across a length of the differential temperature probe 300. The electrodes can be formed from the same conductive material, or may be formed from different conductive materials. Similarly, the electrodes can be formed from the same material as a linear trace, although this may not be required. The reference end can be thermally coupled to a sensing surface of a temperature sensor, such as described above in reference to FIGS. 1-2.

As with other embodiments described herein, a first set of linear traces, formed from a first conductive material, can extend from the reference end to the distal end. For simplicity of illustrate a single linear trace of the first set of linear traces is identified in the figure as the linear trace 308.

The differential temperature probe 300 also includes a second set of linear traces, formed from a second conductive material different from the first conductive material, that doubles back from the first set of linear traces. In particular, the second set of linear traces extends from the distal end to the reference end. For simplicity of illustrate a single linear trace of the second set of linear traces is identified in the figure as the linear trace 310.

The first set of linear traces and the second set of linear traces are conductively coupled (defining junctions) at the reference end and the distal end respectively so as to define a single continuous conductive path between the first electrode 304 and the second electrode 306. The single continuous path can be described and/or characterized by a number N of "returns" or switchbacks that define the path. For example, a first implementation can include 10 returns, whereas a second implementation can include 5 returns. As such, it may be appreciated that "turn" as described herein can refer to a single thermocouple defining an advancing trace and a returning trace joined together at a junction at the distal end of a temperature probe as described herein.

Figure 3B:
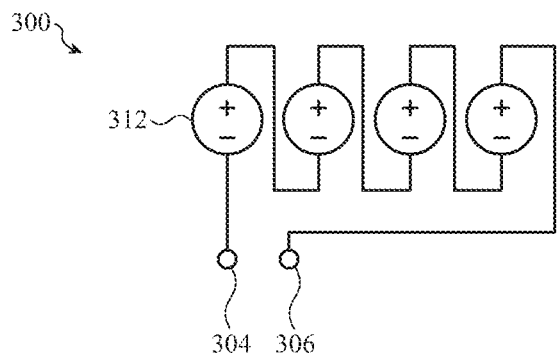
FIG. 3B depicts a schematic representation of the differential temperature probe of FIG. 3A.

It may be further appreciate that each turn of embodiments described herein generate a voltage between leads thereof. In this manner, each turn can be modeled as a temperature dependent voltage source. In this manner, coupling multiple returns together in the manner depicted and described in reference to FIG. 3A can be modeled as a series-connected set of temperature dependent voltage sources. An example schematic is shown in FIG. 3B, which abstracts a set of returns of the differential temperature probe 300 into a set of voltage sources, coupled in series. For simplicity of illustration the linear trace 308 and the linear trace 310 are collectively identified in FIG. 3B as the voltage source 312. A person of skill in the art may readily appreciate that the number of returns of a particular embodiment defines the voltage sensitivity and voltage output of that embodiment in a linear manner. In other words, an embodiment implemented with 10 returns may be twice as sensitive to changes in temperature as an embodiment implemented with 5 returns. As a result, it may be appreciated that a number of returns selected for a particular embodiment can vary based on sensitivity requirements and/or manufacturing requirements; some implementations may require a first number of returns, whereas other implementations may require a different number of turns. In still further embodiments, sets of turns defining a single conductive trace can be tapped in a center location or another location.

Returning to FIG. 3A, as noted above, the difference in conductive material between the first set of linear traces and the second set of linear traces leverages the Seebeck effect to generate a voltage between the first electrode 304 and the second electrode 306. The voltage generated between these electrodes corresponds directly to a temperature difference ($\Delta T$) between the reference end ($T_1$) and the distal end ($T_2$). Example suitable materials for the first and second sets of linear traces include constantan and chromel. In other cases, constantan and copper may be used.

A differential temperature probe as described herein can be formed in a number of ways. For example, as noted above, in some cases, the junctions coupling the first set of linear traces to the second set of linear traces can be vias defined through the substrate. In other cases, the second set of linear traces can be disposed over the first set of linear traces in a successive manufacturing step.

Figure 4:
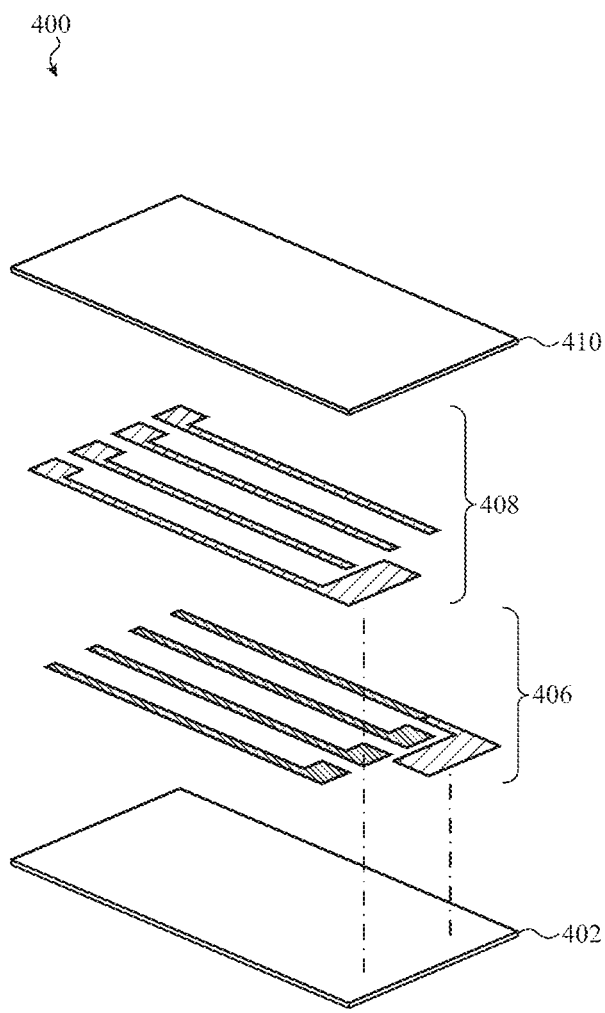
FIG. 4 is an assembly view of a differential temperature probe of a temperature sensing system, as described herein.

For example, FIG. 4 depicts an assembly view of a differential temperature probe of a temperature sensing system, as described herein. As with the embodiment depicted in FIG. 3A, the differential temperature probe 400 includes a substrate 402 (which may be flexible, such as a thin-film substrate) onto which a first set of linear traces 406 can be disposed. Thereafter, a second set of linear traces 408 can be disposed in a manner or pattern such that at least a portion of each successive linear traces of the second set of linear traces 408 conductively couples with a respective one trace of the first set of linear traces 406, thereby defining a single conductive trace extending from a reference end to a distal end, such as described above. In many examples, the sets of linear traces can be encapsulated with a passivation layer 410, although this may not be required of all embodiments.

These foregoing embodiments depicted in FIGS. 1-4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, a differential temperature probe as described herein can be implemented in manners different than depicted above in reference to FIGS. 3A-3B. For example, a high aspect ratio need not be required in all implementations. In other examples, a rectilinear shape need not be required.

Figure 5A:
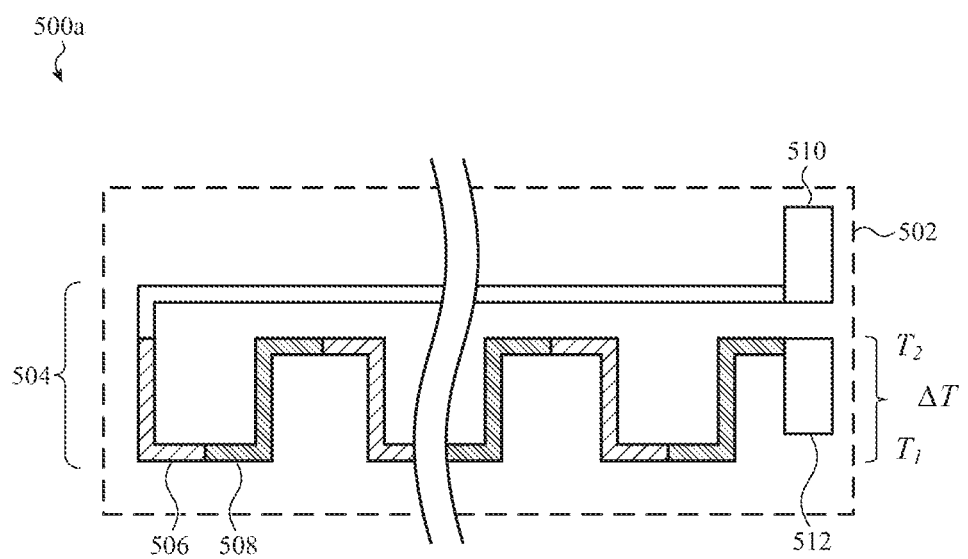
FIGS. 5A-5G depict example constructions of a differential temperature probe as described herein.
Figure 5B:
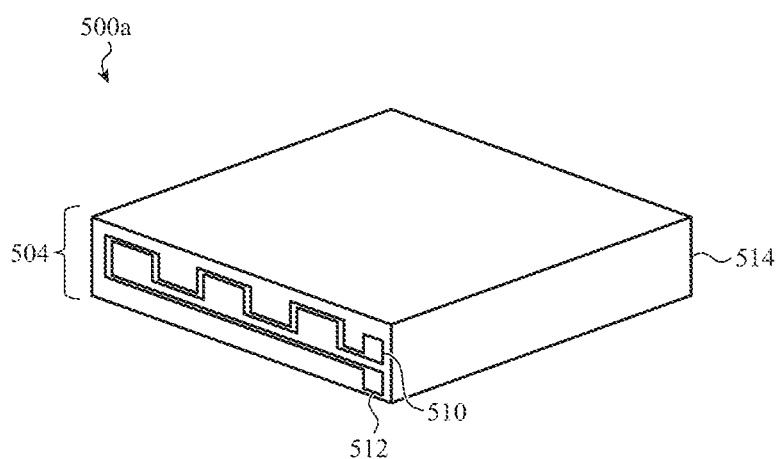

For example, FIGS. 5A-5B depict an example differential temperature probe that takes a low aspect ratio rectilinear shape. In particular, as with other embodiments described herein, the temperature probe 500a implemented as an in-plane thermopile can be supported by a substrate 502 onto which a continuous conductive path 504. The continuous conductive path 504 is defined, at least in part, by one or more returns formed from traces of alternating conductive materials joined at junctions defined on a first edge of the temperature probe 500a and a second edge of the temperature probe 500a. In this example construction, two sections of a single return (e.g., a single thermocouple of the in-plane thermopile) are identified as the first section 506 and the second section 508. As with other embodiments described herein, these conductive materials can be metals, semiconductors, metal or semiconductor alloys, or any combination thereof.

In this construction, a temperature gradient can be measured across a shorter orthogonal dimension of the substrate 502. In particular, a voltage between a first electrode 510 (also referred to as a lead or a hot-bar pad or a solder pad) and a second electrode 512 corresponds to a temperature gradient between a top region of the continuous conductive path 504 and the bottom of the continuous conductive path 504.

A construction such as depicted in FIG. 5A can be disposed onto and/or formed onto a substantially planar surface within an electronic device housing. For example, as shown in FIG. 5B, the temperature probe 500a can be disposed onto a flat surface of an object 514. The object 514 can be any suitable object, surface, or component that may be disposed within and/or may define a portion of, an electronic device or an electronic device housing. In some examples, the object is, without limitation: a sensor (e.g., temperature sensor, humidity sensor, touch input sensor, optical sensor, depth sensor, direct or indirect time of flight sensor and so on); a camera; a battery; a processor; a back crystal; a front crystal; a watch band; a lug insert region; a smart accessory (e.g., stylus, trackpad, keyboard, and so on); and so on. In the illustrated configuration, the temperature probe 500a is configured to detect a temperature gradient through a thickness of the object 514 from a top surface of the object 514 to a bottom surface of the object 514. It may be appreciated, however, that this is merely one example configuration and that other configurations and layouts of the temperature probe 500a are possible.

For example, in some embodiments, the temperature probe 500a, and in particular, the substrate 502 can be disposed to contour to a surface, edge, or other boundary between one or more surface of the object 514 or another object (see, e.g., FIG. 5B). For example, in some constructions, at least a portion of the temperature probe 500a can bend around a corner or edge of the object 514. In other examples, a surface of the object 514 may be curved, patterned, or otherwise non-planar. In such examples, it may be appreciated, that the temperature probe 500a can be configured to follow at least one contour of the object 514.

In still further examples, the temperature probe 500a can be at least partially disposed within the object 514. For example, the object may be a molded part and the temperature probe may be insert molded within the object 514. In other cases, the object 514 may include a curable material, into which the temperature probe 500a can be inserted prior to curing thereof.

In yet other examples, multiple temperature probes can be disposed onto the object 514, in different orientations. In such constructions, different temperature gradients can be determined.

In the illustrated embodiment the first electrode 510 and the second electrode 512 are illustrated as being formed in-plane and in line with the continuous conductive path 504 defining the temperature probe 500a. This is not required of all embodiments.

Figure 5C:
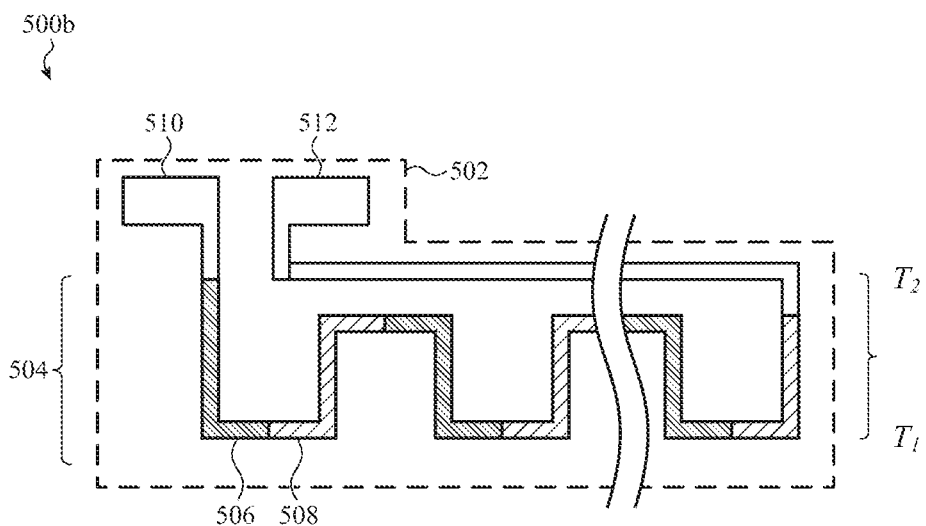

For example, as shown in FIG. 5C, a temperature probe 500b can be supported by the substrate 502. The substrate 502 in this example is formed in an L-shape. In another phrasing, the first electrode 510 and the second electrode 512 are disposed in an orthogonal direction to a sensing direction of the temperature probe 500b, which like the temperature probe 500a may be through a smaller orthogonal major dimension of the substrate 502. As a result of this construction, the electrodes can be folded over a corner or edge of the object 514, such as shown in FIG. 5D.

Figure 5D:
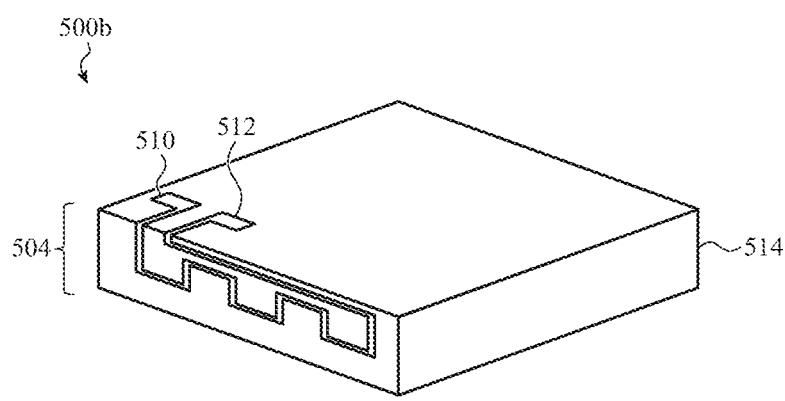

It may be appreciated that non rectilinear shapes are possible beyond the example shown in FIG. 5C and FIG. 5D. In addition, it may be appreciated that a single contiguous and/or monolithic substrate may not be required. In some examples, a substrate as described herein can include one or more apertures, holes, vias, or other cutouts or through-cuts. Traces defining one or more continuous conductive paths can circumscribe these cutouts, may traverse from one surface of the substrate to another surface of the substrate via one or more of the cutouts, may partially take the shape of a cutout (e.g., a portion of a sidewall of a cutout may be a portion of a conductive material), and so on. In some cases, a series of perforations may be defined through the substrate to aide in manufacturing. For example, as shown in FIG. 5D, a substrate as described herein may be configured to bend along an axis to at least a particular bend radius. In such constructions, one or more perforations can be defined, formed, or otherwise made through the substrate and/or through one or more conductive traces defined on the substrate in order to aid in bending of the substrate along a line formed by the perforations.

Figure 5E:
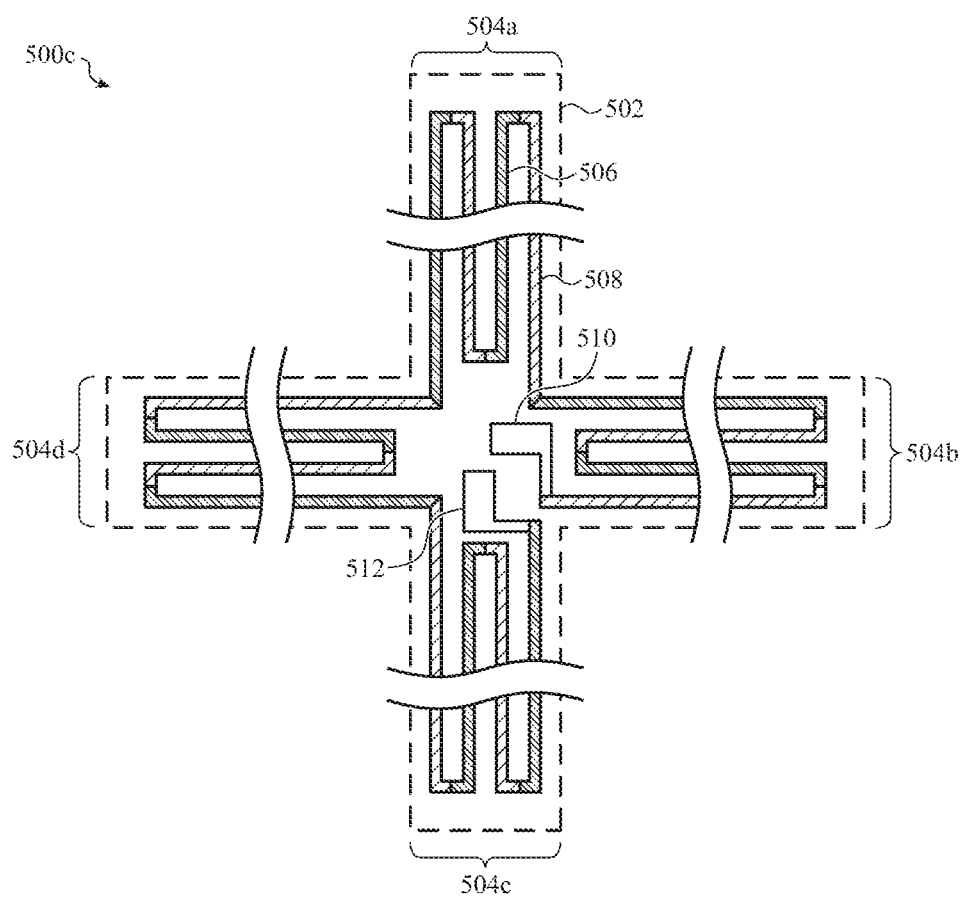
Figure 5F:
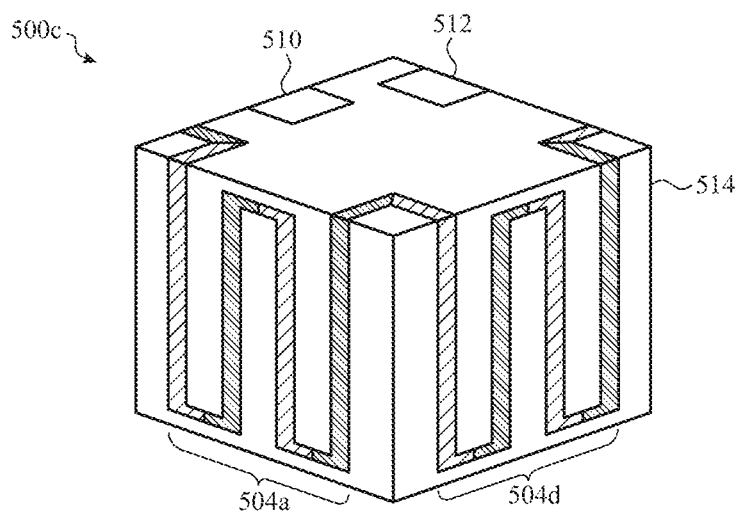

In yet further embodiments, a rectilinear or substantially rectilinear shape may not be required at all. For example, as shown in FIGS. 5E-5F, a cross-shaped temperature probe may be suitable in some implementations. In particular, in FIG. 5E, a temperature probe 500c is depicted. The temperature probe 500c is disposed onto a cross-shaped substrate identified as the substrate 502. A single conductive path (and/or more than one conductive paths) can be defined onto the substrate. In the illustrated embodiment, the single conductive path includes segment paths 504a-504d. As with preceding embodiments, a voltage can be generated between a first electrode 510 and a second electrode 512. It may be appreciated in view of the foregoing description that a voltage developed between these electrodes corresponds to an average temperature at each of the four distal ends of each illustrated arm segment of the cross-shaped substrate depicted in FIG. 5E. In other cases, more or fewer arms may be included. Some arms may be rectilinear, whereas others may be curved in one direction or dimension or more than one direction or dimension. Any suitable shape can be formed by a substrate as defined herein. In further examples, a temperature probe as described herein can be formed directly onto an interior surface or an exterior surface of a housing portion, component housing, module housing, or any other suitable surface associated with an electronic device.

As a result of this example construction, the segment paths of the cross-shaped substrate can be formed to different surfaces of an object 514 (see, e.g., FIG. 5F). In other cases, different segments paths can be disposed, adhered, or otherwise formed into different surface of different objects. In yet further embodiments, different segment paths can have different lengths, can be disposed to contour to different surfaces, shapes, or components, and/or may defined multiple discrete conductive paths that, in turn, are associated with different pairs of electrodes. In other words, a person of skill in the art may appreciate that a single substrate can host or otherwise support two or more temperature probes as described herein.

These foregoing example embodiments are not exhaustive. Any number of suitable shapes can be selected for a substrate as described herein. In addition, any number of suitable returns and/or conductive path segments can be defined. In another phrasing, any suitable number of thermocouples can be defined in any suitable pattern to define an in-plane thermopile as described herein. For example, in some embodiments, one conductive path includes a first number of returns, whereas a second conductive path includes a second number of returns. In such examples, temperature averaging performed as an automatic result of the radially symmetrical architecture shown in FIG. 5E may be biased. For example, a first arm may have 10 returns, whereas a second arm has 5 returns. In such a construction, the "average" temperature of the first and second arm may be biased toward the temperature of the first arm. A person of skill in the art may readily appreciate that by varying a number of returns on each arm of a multi-arm structure such as shown, multiple different temperatures may be approximated and/or determined.

In yet other examples, multiple folds or contours can be achieved. For example, as shown in FIG. 5F, distal portions of each respective arm of the cross-shaped substrate can be folded out (or in) to contour to a surface parallel to the upper surface of the object 514. In this manner, a cross-shaped substrate can be folded to form a self-supporting structure.

Figure 5G:
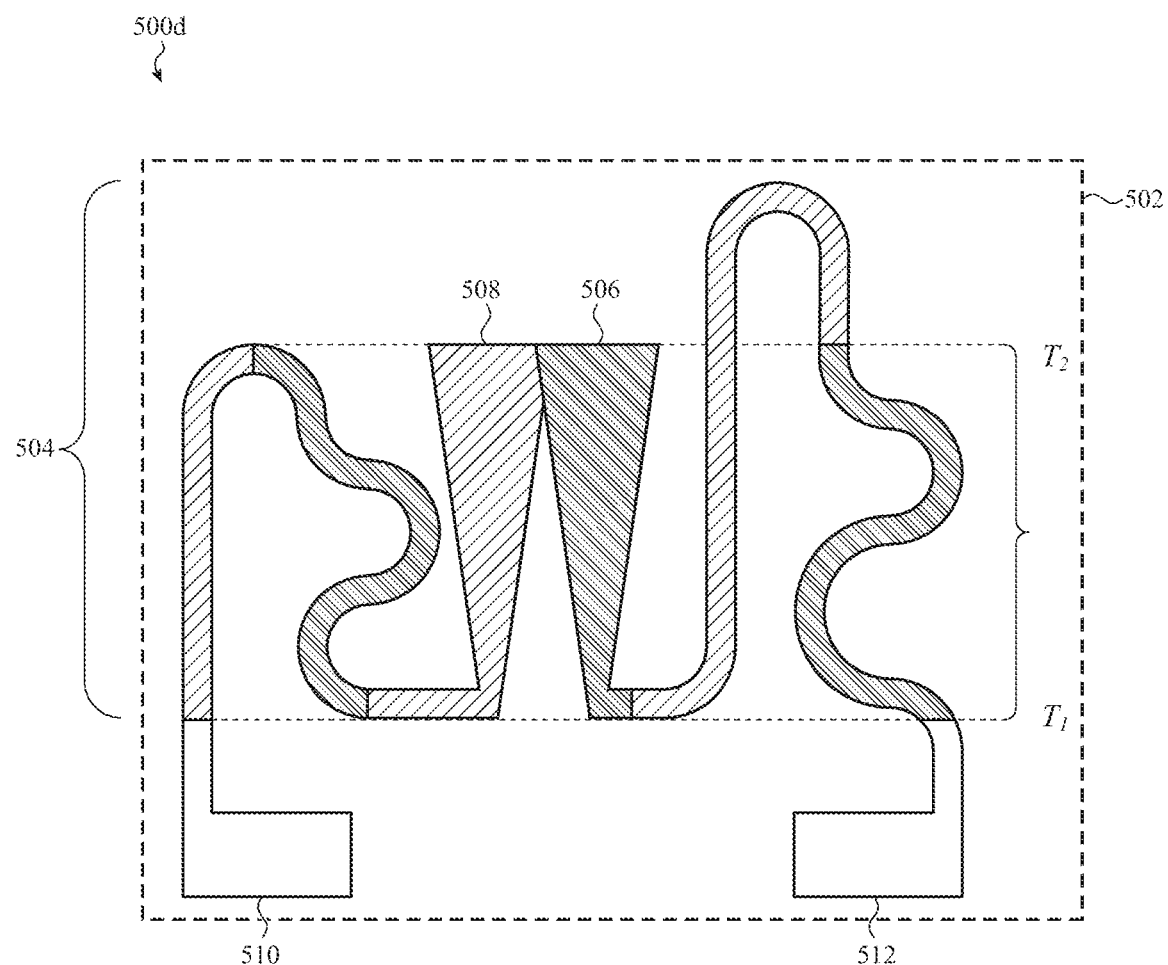

Further to the foregoing, it may be appreciated that linear traces are not required of all embodiments. For example, as noted above, any suitable arbitrary pattern or path can be used. For example, an arbitrary trace path is shown in FIG. 5G. In this embodiment, a temperature probe 500d as described herein can be defined by individual traces made from different metal materials that may take different shapes, may have different trace widths, and so on. In this example, as with preceding examples, a substrate 502 supports the single conductive path 504 that is defined between the electrodes 510 and 512. In this example, however, individual traces of individual returns may take different paths, paths of different lengths, parallel paths, non-parallel paths, and so on. FIG. 5G is presented to emphasize that any suitable path, pattern, and/or any suitable trace width or length or other mechanical or physical property can be used in different embodiments.

Generally and broadly, FIGS. 6A-8 depict flow charts that correspond to example operations of methods related to manufacturing and operating a temperature sensing system as described herein. It may be appreciated, however, that these methods are provided as examples for simplicity of description and are not intended to exhaustively list all methods of manufacturing or all methods of operating that may apply to a system as described herein.

Figure 6A:
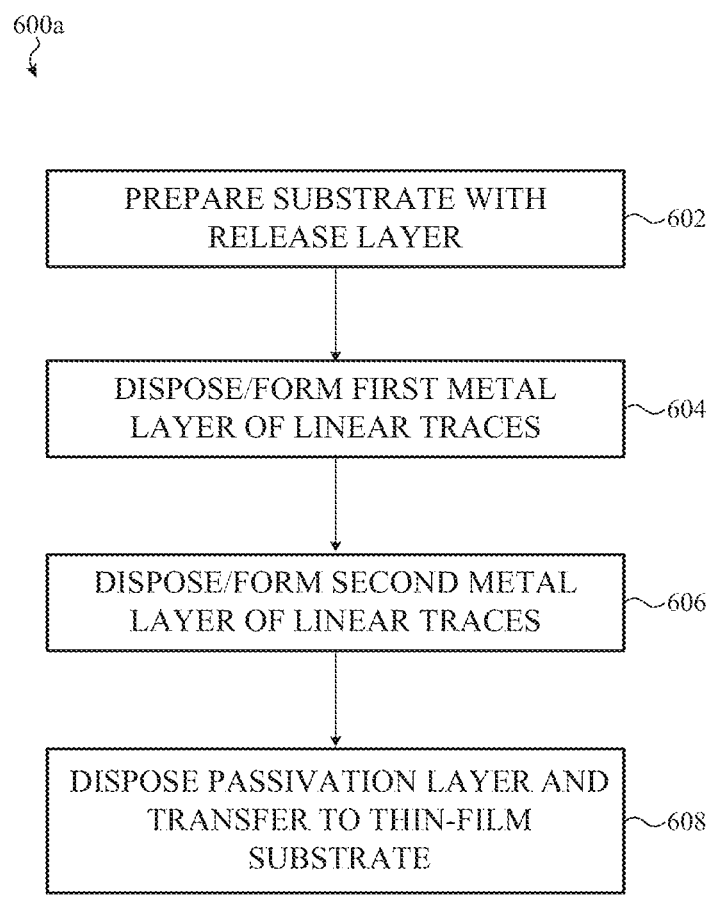
FIG. 6A is a flowchart depicting example operations of a method of manufacturing a differential temperature probe, such as described herein.
Figure 6B:
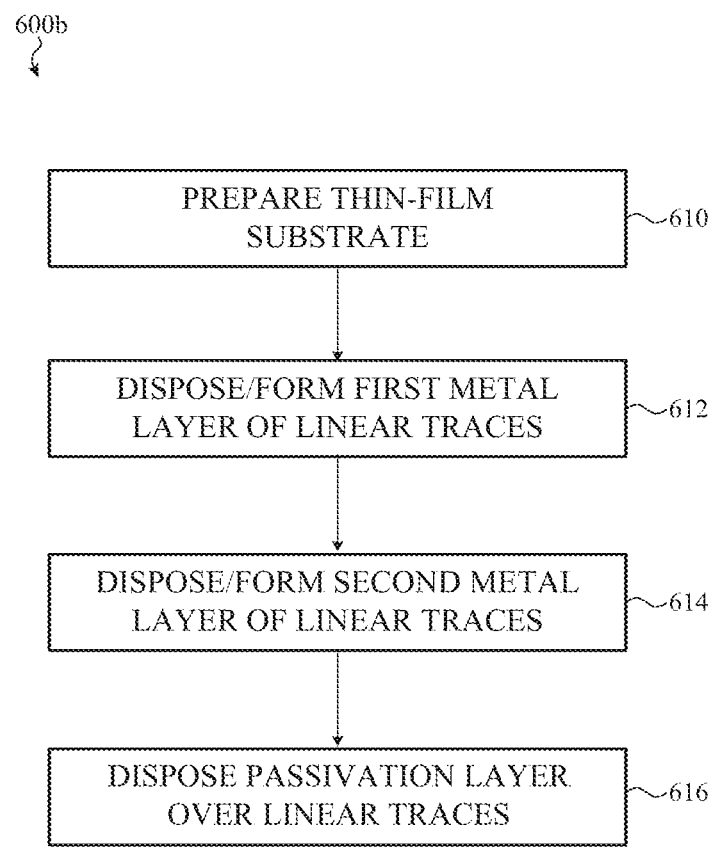
FIG. 6B is a flowchart depicting example operations of a method of manufacturing a differential temperature probe, such as described herein.
Figure 7:
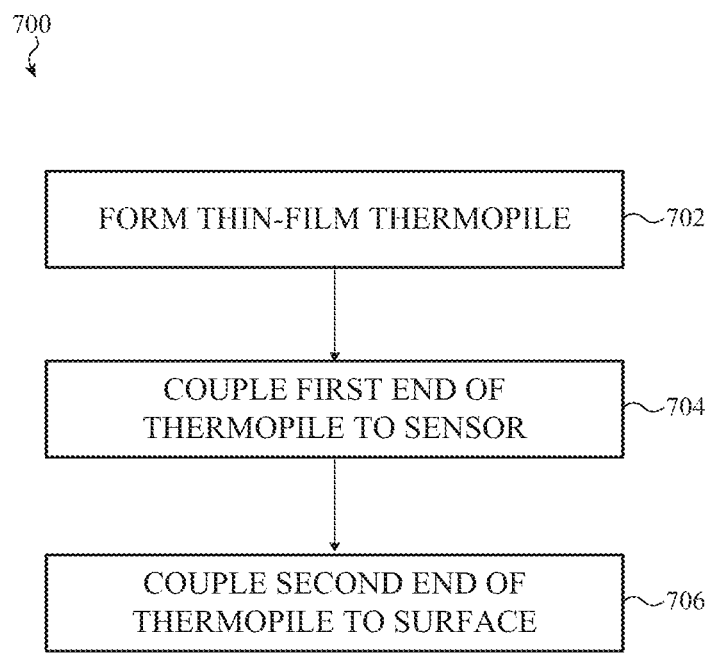
FIG. 7 is a flowchart depicting example operations of a method of manufacturing a temperature sensing system, such as described herein.

More particularly, FIGS. 6A-7 depict flow charts that correspond to example operations of methods related to manufacturing a temperature sensing system as described herein. It may be appreciated that differently-configured differential temperature probes may be manufactured in different ways. For example, a first implementation of a differential temperature probe as described herein may be manufactured leveraging a metal lamination process, whereas another differential temperature probe may be manufactured leveraging a sputtering process. Example processes that may be suitable for different example embodiments include, but are not limited to: physical deposition (e.g., evaporative techniques, sputtering techniques, and so on); chemical deposition techniques (e.g., electroplating techniques, electroless plating techniques, chemical vapor deposition, chemical etching, and so on); intermediate/sacrificial layer techniques (e.g., photoresist, stripping, developing, and so on), Any number of suitable techniques can be employed to form a differential temperature probe as described herein. The embodiments that follow are presented as examples.

Further, it may be appreciated that different manufacturing techniques may be preferred or required depending upon what substrate material is required of a particular implementation; forming a differential temperature probe over a thin-film flexible substrate may invoke a different manufacturing process than forming a differential temperature probe over a rigid silicon die. As such, it may be appreciated that manufacturing techniques as described herein may be modified to include different steps, may substitute certain steps for other steps, or may include fewer steps as appropriate given a specific implementation.

FIG. 6A is a flowchart depicting example operations of a method of manufacturing a differential temperature probe, such as described herein.

The method 600a includes operation 602 at which a substrate layer is selected and prepared for manufacturing. In many cases, the substrate layer is a rigid layer made from a material such as glass. In other cases, the substrate layer may be made from another material that is either dielectric or conductive.

In many embodiments, the substrate layer has disposed thereon a release layer to assist with later operations. In some cases, a release layer may not be required (see, e.g., FIG. 6B).

The method 600a includes operation 604 at which a first set of parallel linear traces is formed and/or disposed onto the substrate layer. The first set of linear traces is disposed, in some embodiments on a first side of the substrate from a first electrically conductive material, such as constantan. In other cases, other metals, semiconductors, or metal alloys can be used.

In addition, the method 600a includes operation 606 at which a second set of parallel linear traces is formed and/or disposed onto the substrate layer. In some embodiments, the second set of linear traces is disposed in an interlaced manner between the first set of linear traces. In other cases, the second set of linear traces is formed on a second side of the substrate that is opposite to the first side.

The second set of linear traces is formed form a second conductive material different from the first conductive material. As noted above the pair of selected conductive materials can be any suitable pair that exhibits a Seebeck coefficient with a high absolute value.

In these embodiments, the second set of linear traces and the first set of linear traces are coupled together at each of the reference end (the first end) and the distal end (the second end) of the differential temperature probe. In this manner, a single conductive trace is formed that takes a serpentine pattern. More specifically, a first portion of the conductive trace is formed from the first conductive material and extends from the first end to the second end to meet a first junction. A second portion of the conductive trace is formed from the second conductive material and extends from the first junction at the second end back to the first end to meet a second junction. A third portion of the conductive trace is formed from the first conductive material and extends from the second junction at the first end back to the second end to meet a third junction, and so on. In this example, the first portion, the first junction, and the second junction cooperate to define a single thermocouple among a series of thermocouples defining the thermopile. In typical embodiments, each of the first portion, the second portion and the third portion are parallel relative to one another but this may not be required of all embodiments.

In some examples, the junctions formed at the first end and the second end may be made from the first conductive material or the second conductive material. In other cases, the junctions may be defined by vias that extend through the substrate. In these examples, the first set of linear conductive traces is defined on a first side of the substrate and the second set of linear conductive traces is define on a second side of the substrate.

Regardless of how constructed for a particular embodiment, the method 600a further includes operation 608 at which a passivation or encapsulation layer may be disposed over each layer of metal/conductive traces. The passivation layer prevents oxidation and provides mechanical support for the conductive traces. In some cases, passivation may not be required. The passivation layer can be made of any suitable material and may be laminated, deposited, printed, screened, or adhered in any suitable manner. In some examples, the passivation layer is formed from adhesives, thin-film polyimide, thin-film polyethylene terephthalate or combinations thereof.

A method similar to the method 600a is depicted in FIG. 6B. In particular, FIG. 6B is a flowchart depicting example operations of a method of manufacturing a differential temperature probe, such as described herein. The method 600b includes operation 610 in which a thin-film substrate is selected. Unlike operation 602 of the method 600a depicted in FIG. 6A, the thin-film substrate (or any other substrate selected) is not a process substrate but is rather the final substrate onto which linear traces may be formed. In other words, the operation 610 differs from operation 602 in that operation 602 includes a release layer which is leveraged at operation 608. By contrast, the operation 610 prepares a thin-film substrate (e.g., with surface treatments, temperature control, and so on) without a release layer.

The method 600b advances to operations 612 and 614 that, like operation 604 and 606 of method 600a, deposit a first and second set of linear traces from different metals to leverage the Seebeck effect. It is appreciated that these sets of linear traces can be formed in any suitable matter such as described above; this description is not repeated.

The method 600b also includes operation 616 at which a passivation layer or other covering layer or a series of passivation layers are disposed over the linear traces formed by performance of operations 612 and 614.

FIG. 7 is a flowchart depicting example operations of a method of manufacturing a temperature sensing system, such as described herein. The method 700 begins at operation 702 at which a thin-film thermopile is formed, such as by leveraging a manufacturing technique described herein. Thereafter, at operation 704, a first end of the thermopile is coupled to a temperature sensor. Thereafter, at operation 706, a second end of the thermopile is coupled to a surface defining a probe location. In one example, the surface may be an interior surface of an electronic device housing.

In some cases, the operation 704 and 706 may be performed in opposite order or simultaneously.

These foregoing embodiments depicted in FIGS. 1-4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As noted above, FIG. 7 is presented herein as one example of operating a temperature sensing system as described herein. As with the method(s) of manufacturing referenced above, it may be appreciated that the embodiment depicted in FIG. 7 is not exhaustive of all methods of operating a differential temperature probe or a temperature sensing system as described herein.

For example, a differential temperature probe as described above is typically configured to generate an output voltage. However, in certain constructions, an output voltage can be readily converted into a current if applied across a known resistance. As such, it may be appreciated that in certain embodiments, a current input may be correlated to a temperature difference.

Further, in some constructions, a voltage output by a differential temperature probe can be supplied as input to a voltage controlled oscillator that, in turn, generates a periodic signal having a frequency that depends on voltage. In certain configurations, an alternating current domain signal may be preferred to a direct current domain signal. As such, it may be appreciated that in certain embodiments, a frequency input may be correlated to a temperature difference.

As such, more generally and broadly, it may be appreciated that a circuit as described herein can be configured in any implementation-specific manner to convert an output of a differential temperature probe into a temperature measurement. The circuit can leverage a database, a look-up table, a scalar multiplier, or any other suitable analog or digital domain value conversion technique. In one implementation, a look-up table correlating temperature difference to voltage difference may be preferred, although this is merely an example.

Figure 8:
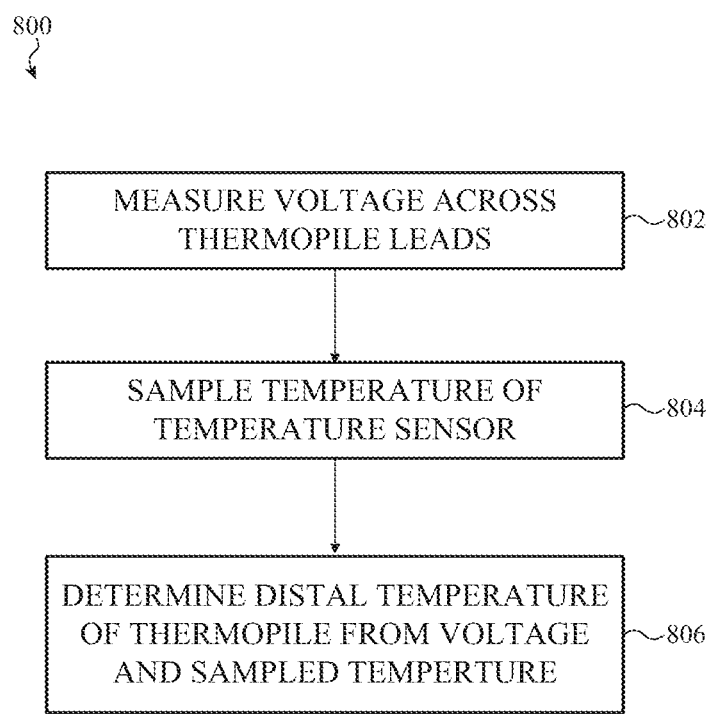
FIG. 8 is a flowchart depicting example operations of a method of operating a temperature sensing system, such as described herein.

FIG. 8 is a flowchart depicting example operations of a method of operating a temperature sensing system, such as described herein. The method 800 includes operation 802 at which a voltage is measured across leads of a thermopile defining a differential temperature probe, as described herein. The voltage can be measured using any suitable circuit or technique. Next, at operation 804, the method 800 advances to sample a temperature of a temperature sensor that is thermally coupled to the differential temperature probe. In particular, as noted above, a reference end of the differential temperature probe is coupled to the temperature sensor and a distal end of the differential temperature probe is coupled to a chosen probe location.

In some cases, the order of operations 804 and 802 may be reversed. In other embodiments, operations 804 and 802 may occur substantially simultaneously.

The method 800 further includes operation 806 at which a temperature at the distal end is determined based on the voltage sampled at operation 802 and the temperature sampled at operation 804. In many embodiments determining the distal temperature (e.g., the probe location absolute temperature) can be performed by leveraging a lookup table that correlates temperature differences to voltage values. This operation can result in obtaining a differential temperature measurement. Thereafter, the differential temperature measurement can be summed with the temperature sampled at operation 704, also referred to as the reference temperature. The sum of the differential temperature and the reference temperature represent the probe location temperature.

Thereafter, the temperature sensor (and/or another circuit coupled to the temperature sensor) can be configured to output, as digital values, one or more of: the reference temperature; the distal temperature; the differential temperature; the measured voltage; or any suitable combination thereof.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. A temperature sensing system for a portable electronic device, the temperature sensing system comprising:
   a thin-film substrate;
   an in-plane thermopile disposed on the thin-film substrate and comprising a conductive trace disposed in a serpentine pattern defined between a first electrode and a second electrode to define an array of thermocouples conductively coupled in series; and
   a temperature sensor defining a sensing surface, the in-plane thermopile being coupled to the sensing surface, wherein:
   the thin-film substrate is folded to form a plurality of segments, and
   the conductive trace is disposed on multiple segments of the plurality of segments.

2. The temperature sensing system of claim 1, wherein the thin-film substrate is formed from one or more materials in a group consisting of:
   polyimide;
   polyethylene terephthalate;
   polycarbonate;
   plastics;
   acrylics; and
   liquid crystal polymers.

3. The temperature sensing system of claim 1, wherein the in-plane thermopile further comprises a passivation layer disposed over the conductive trace.

4. The temperature sensing system of claim 1, wherein the thin-film substrate has a cross-shape having four arm segments, wherein each of the four arm segments form a corresponding segment of the plurality of segments.

5. The temperature sensing system of claim 4, wherein the conductive trace is positioned on each of the four arm segments.

6. The temperature sensing system of claim 1, wherein the serpentine pattern comprises:
   a first array of parallel conductive traces; and
   a second array of parallel conductive traces that is parallel to the first array of parallel conductive traces.

7. The temperature sensing system claim 6, wherein:
   the first array of parallel conductive traces is disposed on a first surface of the thin-film substrate; and
   the second array of parallel conductive traces is disposed on a second surface of the thin-film substrate opposite the first surface.

8. The temperature sensing system of claim 7, wherein the in-plane thermopile comprises:
   a plurality of vias defined through the thin-film substrate, each of the plurality of vias conductively coupling one respective conductive trace of the first array with one respective conductive trace of the second array.

9. The temperature sensing system of claim 6, wherein:
   each trace of the first array of parallel conductive traces is formed from a first conductive material; and
   each trace of the second array of parallel conductive traces is formed from a second conductive material.

10. The temperature sensing system of claim 9, wherein the first conductive material is constantan and the second conductive material is selected from chromel or copper.

11. The temperature sensing system of claim 6, wherein:
    the first electrode and the second electrode are positioned on a first segment of the plurality of segments; and
    the first array of parallel conductive traces and the second array of parallel conductive traces are positioned on a second segment of the plurality of segments.

12. A temperature sensing system for an electronic device, the temperature sensing system comprising:
    a temperature sensor defining an exterior surface; and
    a temperature probe coupled to the temperature sensor and formed from a thin-film material, the temperature probe comprising:
    a flexible substrate defining:
    a conductive trace defining a conductive path between a pair of leads, the conductive trace disposed in a serpentine pattern between the pair of leads, the conductive trace comprising:
    a first set of traces disposed from a first conductive material; and
    a second set of traces disposed from a second conductive material; wherein:
    the flexible substrate is folded to form a plurality of segments, and
    the conductive trace is disposed on multiple segments of the plurality of segments.

13. The temperature sensing system of claim 12, wherein:
    the flexible substrate is folded around an edge of a component of the electronic device different from the temperature sensor, the component being disposed within the electronic device.

14. The temperature sensing system of claim 12, wherein the first set of traces is disposed on a first surface of the flexible substrate and the second set of traces is disposed on a second surface of the flexible substrate opposite the first surface.

15. The temperature sensing system of claim 12, wherein:
    the first conductive material and the second conductive material are selected from the group consisting of:
    nickel alloys;
    constantan;
    chromel; and
    semiconductors; and
    the first conductive material is different from the second conductive material.

16. The temperature sensing system of claim 12, wherein the flexible substrate is formed from one or more materials in a group consisting of:
    polyimide;
    polyethylene terephthalate;
    polycarbonate;
    plastics;
    acrylics; and
    liquid crystal polymers.

17. The temperature sensing system of claim 12, wherein the temperature probe further comprises a passivation layer disposed over the conductive trace.

18. The temperature sensing system of claim 12, wherein the flexible substrate has a cross-shape having four arm segments, wherein each of the four arm segments form a corresponding segment of the plurality of segments.

19. The temperature sensing system of claim 18, wherein the conductive trace is positioned on each of the four arm segments.

* * * * *